(12) United States Patent
Kita et al.

(10) Patent No.: US 6,423,452 B1
(45) Date of Patent: *Jul. 23, 2002

(54) HYDROCARBON POLYMER BASED NONAQUEOUS ELECTROLYTIC SECONDARY BATTERY AND METHOD OF MAKING THE SAME

(75) Inventors: Akinori Kita; Naoko Inagaki, both of Kanagawa; Atsuo Omaru; Akio Takahashi, both of Fukushima, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,459

(22) Filed: Dec. 17, 1998

(30) Foreign Application Priority Data

Dec. 22, 1997 (JP) .............................................. 9-353455

(51) Int. Cl.⁷ ................................................. H01M 6/14
(52) U.S. Cl. ........................ 429/303; 429/324; 429/342; 429/231.1; 429/231.4; 429/231.8
(58) Field of Search ................................ 429/303, 300, 429/324, 330, 332, 342, 341, 231.1, 231.4, 231.8; 252/62.2

(56) References Cited

U.S. PATENT DOCUMENTS

| | | | | |
|---|---|---|---|---|
| 5,549,987 A | * | 8/1996 | Venugopal et al. | 429/188 |
| 5,605,772 A | * | 2/1997 | Yazami et al. | 429/190 |
| 5,705,084 A | * | 1/1998 | Kejha | 252/62.2 |
| 5,795,679 A | * | 8/1998 | Kawakami et al. | 429/218.1 |
| 5,910,381 A | * | 6/1999 | Barker et al. | 429/197 |
| 5,962,168 A | * | 10/1999 | Denton, III | 429/303 |
| 5,965,299 A | * | 10/1999 | Khan et al. | 429/313 |

FOREIGN PATENT DOCUMENTS

| | | | |
|---|---|---|---|
| DE | 3912954 | * | 8/1990 |
| JP | 10-112334 | * | 4/1998 |

* cited by examiner

*Primary Examiner*—Laura Weiner
(74) *Attorney, Agent, or Firm*—Sonnenschein, Nath & Rosenthal

(57) ABSTRACT

A nonaqueous electrolytic secondary battery includes a negative electrode, a positive electrode, and a nonaqueous electrolytic solution including an electrolytic salt dissolved in a nonaqueous solvent. A polymer is added to the nonaqueous electrolytic solution. Also, a method of making a nonaqueous electrolytic secondary battery includes the steps of placing a negative electrode, a positive electrode, and a nonaqueous electrolytic solution including an electrolytic salt dissolved in a nonaqueous solvent, in a battery housing to assemble a battery; and charging and discharging the battery under overcharge conditions or applying a pulse voltage to the battery.

5 Claims, 2 Drawing Sheets

HYDROCARBON POLYMER BASED NONAQUEOUS ELECTROLYTIC SECONDARY BATTERY AND METHOD OF MAKING THE SAME

BACKGROUND OF THE INVENTION

1. Field of the Invention

The present invention relates to a nonaqueous electrolytic secondary battery and a method of making the same, and, more particularly, to the improvement in charge and discharge cycling characteristics.

2. Description of the Related Art

With the recent advancement of electronics technology, small portable electronic devices such as camcorders, portable telephones, and laptop computers have been developed. In response to this, the development of a small and light secondary battery having high energy density as a portable power supply for the electronic equipment has been strongly demanded.

A nonaqueous electrolytic secondary battery that uses a light metal such as lithium, sodium, or aluminum as an active material for the negative electrode is expected as a secondary battery to meet the demand described above.

In theory, a nonaqueous electrolytic secondary battery can generate a high voltage and can have high energy density. Research and development have been active, in particular, on a nonaqueous electrolytic secondary battery using lithium as an active material for the negative electrode because of its high output and high energy density.

However, when a light metal such as lithium is used for a negative electrode as it is, the light metal is easily precipitated dendritically from the negative electrode during charging. Since the tip of the dendrite crystal has significantly high electric current density, the nonaqueous electrolytic solution decomposes, resulting in a decrease in cycling life, or the dendrite crystal precipitated from the negative electrode reaches the positive electrode, resulting in an internal short circuit of the battery.

In order to prevent such dendritical metal precipitation, instead of using a light metal as it is for the negative electrode, a carbonaceous material capable of being doped and undoped with light metal ions is used as a material for the negative electrode after the carbonaceous material is doped with the light metal ions.

As the carbonaceous material, graphite, cokes (e.g., pitch coke, needle coke, and petroleum coke), organic polymeric compounds (e.g., phenolic resin or furan resin that is at an appropriate temperature for carbonization), or the like is mainly used.

With respect to the nonaqueous electrolytic secondary battery that uses the carbonaceous material for the negative electrode, various improvements have been made in order to improve the charge and discharge cycling life and safety.

For example, one of the known factors which shorten the charge and discharge cycling life is decomposition of an electrolytic solution caused by direct contact between the electrode and the electrolytic solution. In order to prevent such decomposition of the electrolytic solution, Japanese Patent Laid-Open Nos. 4-22072, 7-134989, and 6-22282 disclose batteries, in which negative electrodes are coated with polymeric materials so that the electrodes and the electrolytic solutions do not come into direct contact with each other.

Also, in accordance with Japanese Patent Laid-Open No. 7-192753, in a battery using a wound electrode member in which a strip negative electrode and a strip positive electrode laminated with a separator therebetween are wound up in a coil, by inserting a polymer core in the center of the wound electrode member, a rapid rise of the battery temperature during an external short circuit is prevented.

However, the above-mentioned methods will cause the problems described below.

First, in order to fabricate a negative electrode coated with a polymer, a conductive polymer is coated on the surface of the negative electrode, or carbonaceous particles as a material for a negative electrode are treated with a solution in which a polymer is dissolved to coat the surface of the particles and a negative electrode is fabricated using the carbonaceous particles.

However, when the surface of the negative electrode is coated with the polymer in such a manner, the fabrication process of the negative electrode becomes complex, resulting in low productivity of a battery. Also, in accordance with the methods described above, it is difficult to control the volume of the polymer to be coated, and if the volume of the polymer to be coated is too high, load characteristics and capacity characteristics of the battery are damaged.

With respect to a battery in which a polymer core is inserted in the center of the wound electrode member, the volume occupied by the core is not involved in the battery reaction, and thus the energy density per battery volume decreases.

SUMMARY OF THE INVENTION

Accordingly, the present invention has been made in view of the situation described above, and it is an object of this invention to provide a nonaqueous electrolytic secondary battery, in which charge and discharge cycling characteristics are improved without damaging load characteristics or capacity characteristics, and a temperature rise owing to an external short circuit can be suppressed, and to provide a method of making such a nonaqueous electrolytic secondary battery.

A nonaqueous electrolytic secondary battery in accordance with the present invention includes a negative electrode, a positive electrode, and a nonaqueous electrolytic solution in which an electrolytic salt is dissolved in a nonaqueous solvent, and a polymer is added to the nonaqueous electrolytic solution.

A method of making a nonaqueous electrolytic secondary battery in accordance with the present invention includes the steps of placing a negative electrode, a positive electrode, and a nonaqueous electrolytic solution in which an electrolytic salt is dissolved in a nonaqueous solvent, in a battery housing to assemble the battery, and charging and discharging the battery under overcharge conditions.

Alternatively, a method of making a nonaqueous electrolytic secondary battery in accordance with the present invention includes the steps of placing a negative electrode, a positive electrode, and a nonaqueous electrolytic solution in which an electrolytic salt is dissolved in a nonaqueous solvent, in a battery housing to assemble the battery, and applying a pulse voltage to the battery.

In the nonaqueous electrolytic secondary battery, by adding the polymer to the nonaqueous electrolytic solution, decomposition of the nonaqueous electrolytic solution during charging and discharging is suppressed, and thus charge and discharge cycling characteristics are improved. Also, when the battery temperature is rapidly raised by an external short circuit, the polymer in the nonaqueous electrolytic solution decomposes by absorbing heat, and thus the temperature rise of the battery is relieved.

Also, after assembling the nonaqueous electrolytic secondary battery, by charging and discharging under overcharge conditions or by applying a pulse voltage to the battery, a reaction occurs among a portion of the components in the nonaqueous electrolytic solution to generate a polymer. When the polymer is generated in the nonaqueous electrolytic solution in such a manner, decomposition of the nonaqueous electrolytic solution is suppressed during subsequent charging and discharging, and thus charge and discharge cycling characteristics are improved. Also, when the battery temperature is rapidly raised by an external short circuit, the polymer in the nonaqueous electrolytic solution decomposes by absorbing heat, and thus the temperature rise of the battery is relieved.

DESCRIPTION OF THE PREFERRED EMBODIMENT

Figure 1:
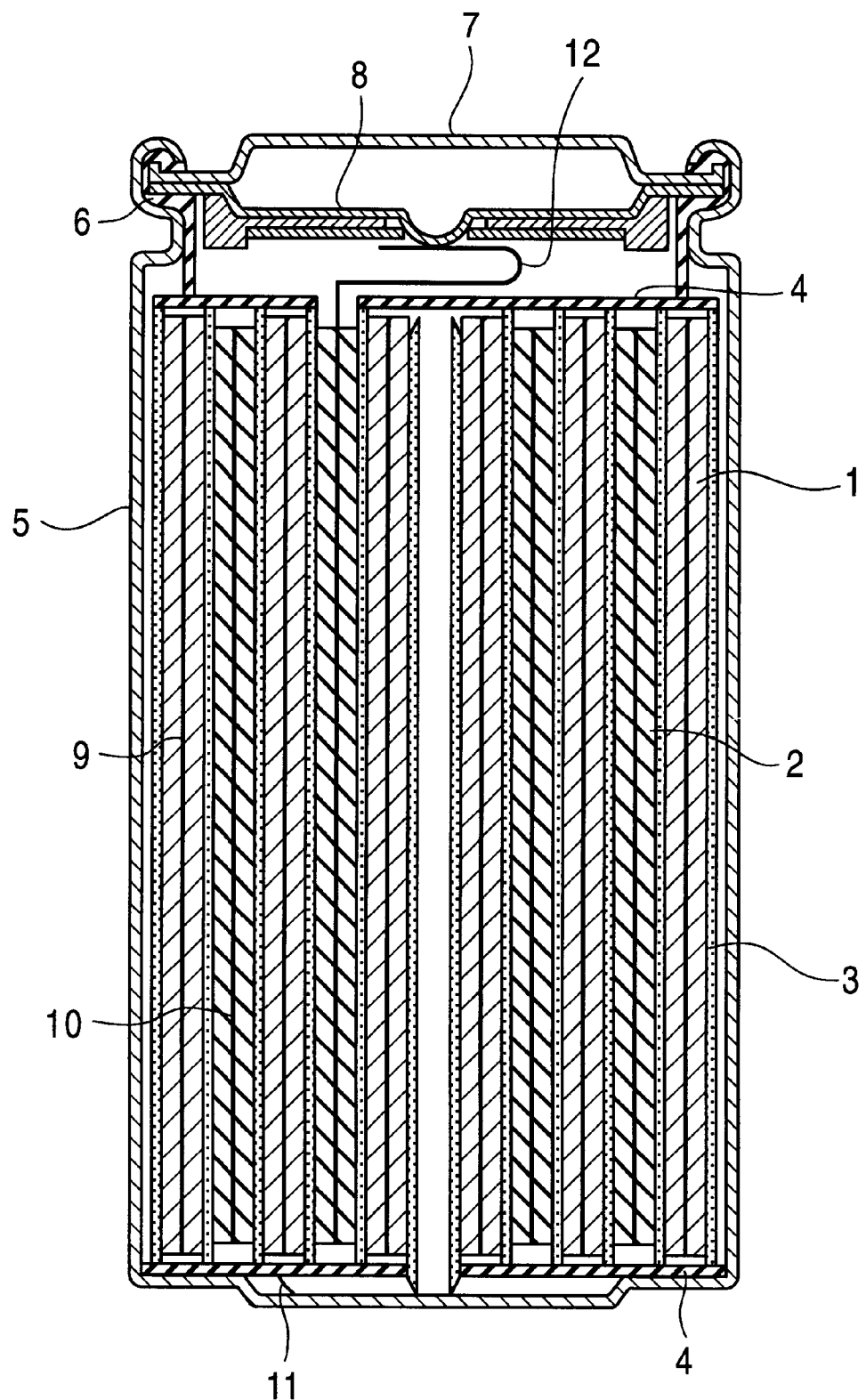
FIG. 1 is a longitudinal sectional view which shows an example of a nonaqueous electrolytic secondary battery in accordance with the present invention.

The embodiments of the present invention will be described.

A nonaqueous electrolytic secondary battery in the present invention includes a negative electrode, a positive electrode, and a nonaqueous electrolytic solution in which an electrolytic salt is dissolved in a nonaqueous solvent.

In the nonaqueous electrolytic secondary battery, in particular, a polymer is added to the nonaqueous electrolytic solution, and thus charge and discharge cycling characteristics are improved and the rapid rise of the battery temperature is suppressed when an external short circuit or the like occurs.

By adding a polymer to the nonaqueous electrolytic solution, such advantages are obtained because of the reasons described below.

When the polymer is added to the nonaqueous electrolytic solution, the polymer precipitates as a coating layer on the surfaces of the negative electrode and the positive electrode by repeated charge and discharge cycling. The coating layer prevents a contact between the electrodes and the nonaqueous electrolytic solution, and decomposition of the nonaqueous electrolytic solution is suppressed.

Since the coating layer precipitated has a smaller thickness than that of a coating layer formed by coating or by treatment with a polymer solution, there is no adverse effect on the battery characteristics. In such a case, since the coating layer is formed without introducing a special process, the production efficiency of the battery is not decreased.

Additionally, if the polymer is added to the nonaqueous electrolytic solution, when the battery temperature is rapidly raised by an external short circuit, the polymer in the nonaqueous electrolytic solution decomposes by absorbing heat, and thus the temperature rise of the battery is relieved.

Moreover, when a portion of the nonaqueous electrolytic solution is composed of a polymer, even if the battery is damaged, the electrolytic solution does not easily leak. Therefore, the safety of the battery increases.

As a polymer to be added to the nonaqueous electrolytic solution, for example, a polymer containing oxygen is used. In particular, it is desirable that a polymer having a molecular weight ranging from 500 to 500,000 be used.

As a polymer containing oxygen, a polymer molecule having a carbonyl group such as ester or ketone may be referred to, for example, polyester represented by Chemical formula 1, a diester polymer represented by Chemical formula 2, and a copolymer of ester and ketone represented by Chemical formula 3.

   [Chemical formula 1]

(where $R^1$ and $R^2$ are hydrocarbon groups.)

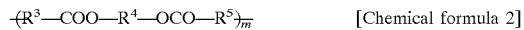   [Chemical formula 2]

(where $R^3{}_1$, $R^4$, and $R^5$ are hydrocarbon groups.)

   [Chemical formula 3]

(where $R^6$, $R^7$, and $R^8$ are hydrocarbon groups.)

Specific examples of diester polymer represented by Chemical formula 2 include the ones represented by Chemical formula 4 and Chemical formula 5.

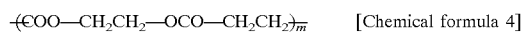   [Chemical formula 4]

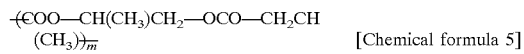   [Chemical formula 5]

Also, a polymer molecule having an ether linkage, or a polymer molecule having both a carbonyl group and an ether group as represented by Chemical formula 6 may be used.

   [Chemical formula 6]

(where $R^9$, $R^{10}$, and $R^{11}$ are hydrocarbon groups.)

The amount of the polymer to be added is preferably in a range from 2 to 5 percent by weight relative to the nonaqueous electrolytic solution. If the amount of the polymer to be added is less than 2 percent by weight, there will be insufficient effects in improving charge and discharge cycling characteristics, or suppressing the rise of the battery temperature by an external short circuit. Also, if the amount of the polymer to be added is more than 5 percent by weight, the battery characteristics may be adversely affected.

As described above, the present invention is characterized by adding a polymer in the nonaqueous electrolytic solution, and, for the other components of the nonaqueous electrolytic solution, any of those generally used may be usable. Preferably, materials described below are used.

As the nonaqueous solvent, a carbonate-based solvent such as propylene carbonate (PC), ethylene carbonate (EC), or dimethyl carbonate (DMC) is preferably used.

As the electrolytic salt, a lithium salt such as $LiPF_6$ or $LiBF_4$ is used.

As materials for the negative electrode and the positive electrode, any of those generally used in a nonaqueous electrolytic secondary battery may be usable.

For example, as a material for the negative electrode, a carbonaceous material or the like is used. A graphite material in which carbon hexagonal layers are regularly placed substantially in parallel may be used, or a non-graphitizing carbon material in which crystallites are randomly oriented may be used. Preferably, the non-graphitizing carbon material has physical properties such as that a space between (002) planes is 0.37 nm or more, the true density is less than 1.70 g/cm³, and exothermic heat does not have a peak at 700° C. or more in a differential thermal analysis (DTA) in air. The non-graphitizing carbon material having the physical properties described above can be obtained, for example, by burning, at 900° C. to 1,300° C., a conjugated system resin such as a furan resin, a phenolic resin, an acrylic resin, a vinyl halide resin, a polyimide resin, a polyamide-imide resin, a polyamide resin, polyacetylene, or poly (p-phenylene), or an organic polymeric compound such as cellulose and its derivative. Also, by using petroleum pitch into which a functional group containing oxygen is introduced (so-called "cross-linked with oxygen") as a starting material, the non-graphitizing carbon material having the physical properties described above can be obtained.

As a material for the positive electrode, a lithium-transition metal double oxide such as lithium cobaltate or lithium manganate, or the like is used.

There is no specific shape required for a nonaqueous electrolytic secondary battery in accordance with the present invention. The secondary battery may be a cylindrical battery having a wound electrode member, a laminated battery having a laminated electrode member in which plate electrodes are laminated interposed with separators, or a coin-type battery having a pellet electrode mold.

FIG. 1 shows an example of a cylindrical nonaqueous electrolytic secondary battery.

In the nonaqueous electrolytic secondary battery, as shown in FIG. 1, a negative electrode 1 including a negative charge collector 9 coated with a negative electrode mixture and a positive electrode 2 including a positive charge collector 10 coated with a positive electrode mixture are wound up with a separator 3 therebetween, and the wound member is packed in a battery can 5 with an insulator 4 being placed on each of the upper and lower ends of the wound member.

A battery cap 7 is mounted on the battery can 5 by caulking joints with a sealing gasket 6 being interposed, and is electrically connected to the negative electrode 1 or the positive electrode 2 through a negative electrode lead 11 or a positive electrode lead 12 for functioning as a negative electrode or a positive electrode of the battery.

In this battery, the positive electrode lead 12 is welded to a sheet 8 for breaking a current, and is electrically connected to the battery cap 7 through the sheet 8 for breaking a current.

In the battery, when the internal pressure of the battery increases, the sheet 8 for breaking a current is pushed up and is deformed. Thereby, the positive electrode lead 12 is disconnected from the sheet 8 for breaking a current except at the welded portion, and an electric current is broken.

Next, a method of making a nonaqueous electrolytic secondary battery in accordance with the present invention will be described with reference to a cylindrical nonaqueous electrolytic secondary battery.

In order to make the nonaqueous electrolytic secondary battery, the negative electrode 1 is fabricated by forming a negative electrode mixture layer containing a negative electrode material on the surface of the negative charge collector 9, and the positive electrode 2 is fabricated by forming a positive electrode mixture layer containing a positive electrode material on the surface of the positive charge collector 10.

The negative electrode 1 and the positive electrode 2 fabricated as described above are wound up with the separator 3 therebetween, and the wound electrode member along with the insulator 4 is placed in the battery can 5. The negative electrode lead 11 drawn from the negative electrode 1 is connected to the battery can 5, and the positive electrode lead 12 drawn from the positive electrode 2 is connected to the battery cap 7. Then, a nonaqueous electrolytic solution prepared by dissolving an electrolytic salt in a nonaqueous solvent is poured into the battery can 5. Next, the battery cap 7 is placed on the opening of the battery can 5, and the battery can 5 is sealed by caulking joints with the sealing gasket 6 being interposed. The sheet 8 for breaking a current described above may be placed under the battery cap 7 as required.

In accordance with the manufacturing method of the present invention, after the battery is assembled as described above, charging and discharging are performed to the battery under overcharge conditions, or a pulse voltage is applied to the battery.

When charging and discharging are performed under overcharge conditions, it is desirable that the battery voltage be set at 4.2 V or more. However, in such a case, if the battery voltage is increased excessively, lithium may be precipitated in the battery, and therefore, it is preferable that the voltage be set in a range from 4.2 V to less than 4.8 V.

On the contrary, when a pulse voltage is applied to the battery, lithium is not precipitated even if the battery voltage is increased to approximately 4.8 V, and thus the voltage may be set relatively highly. Also, when a pulse voltage is applied to the battery, it is desirable that the frequency be set at 10 to 100 KHz.

By charging and discharging under overcharge conditions or by applying a pulse voltage to the battery as described above, a reaction occurs among a portion of the components in the nonaqueous electrolytic solution to generate a polymer. When the polymer is generated in the nonaqueous electrolytic solution, decomposition of the nonaqueous electrolytic solution is suppressed during subsequent charging and discharging, in the same manner as that when a polymer is added in the nonaqueous electrolytic solution, resulting in the improvement in charge and discharge cycling characteristics. Also, when the battery temperature is rapidly raised by an external short circuit, the polymer in the nonaqueous electrolytic solution decomposes by absorbing heat, and thus the temperature rise of the battery is relieved.

The polymer generated depends on the components of the nonaqueous electrolytic solution. For example, if a carbonate-based solvent such as propylene carbonate, ethylene carbonate, or dimethyl carbonate is used, a polymer having a molecular weight of 3,000 or more is generated. Also, by adding a methoxybenzene-based compound to the nonaqueous electrolytic solution, a polymer having a molecular weight of several hundreds of thousands may be generated.

Figure 2:
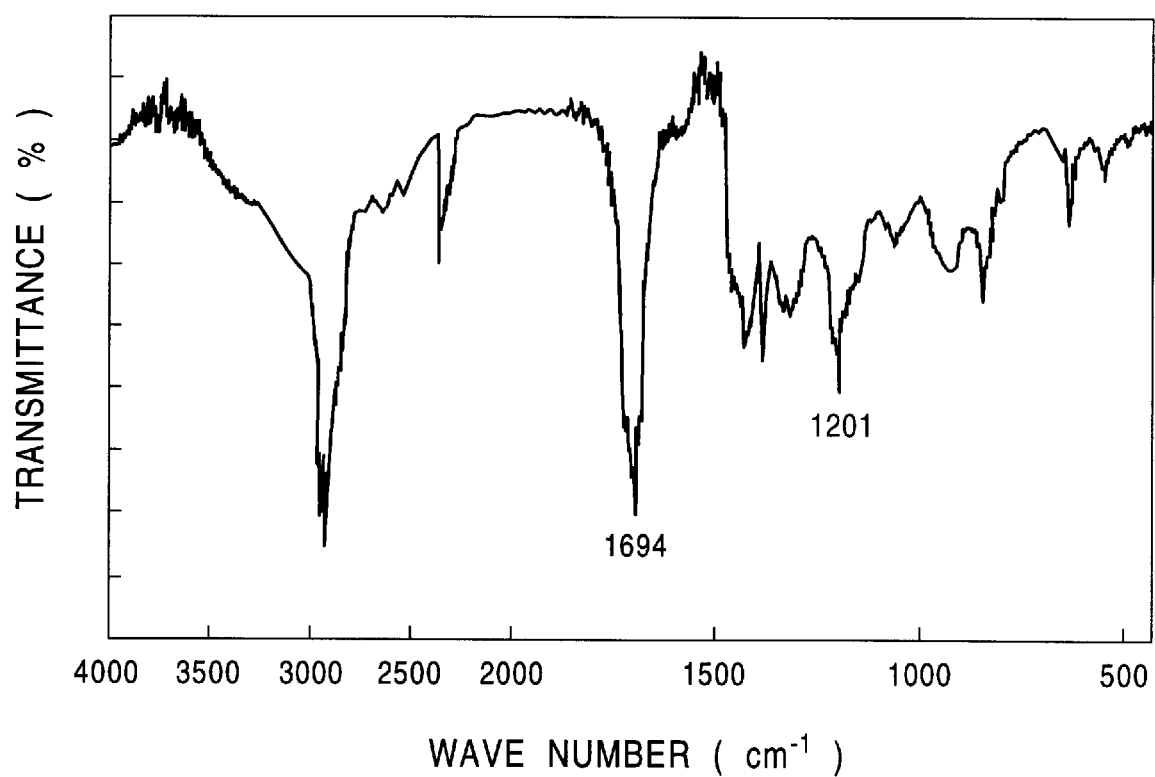
FIG. 2 is a curve which shows the infrared absorption spectrum of a polymer generated in a nonaqueous electrolytic solution.

After charging and discharging were performed at a battery voltage of 4.3 V, a nonaqueous electrolytic solution was withdrawn from the battery, and the infrared absorption spectrum of the polymer separated from the nonaqueous electrolytic solution by gel permeation chromatography is shown in FIG. 2.

The nonaqueous electrolytic solution includes $LiPF_6$ dissolved in a mixed solvent of propylene carbonate, dimethyl carbonate, and methoxybenzene.

FIG. 2 confirms that a polymer having an ester linkage is generated.

Preferred examples of the present invention will be described based on testing results.

EXAMPLE 1

This is an example of a cylindrical nonaqueous electrolytic secondary battery in which a polymer (polyester) represented by Chemical formula 7, where k=100, $R^1=CH_2$, and $R^2=CH_2$, is added to a nonaqueous electrolytic solution.

 [Chemical formula 7]

The nonaqueous electrolytic secondary battery was fabricated in a manner described below.

First, a strip negative electrode was fabricated as follows.

To prepare a negative electrode mixture slurry, 90 parts by weight of non-graphitizing carbon material and 10 parts by weight of polyvinylidene fluoride (PVDF) as a binder were mixed and dispersed in N-methyl-2-pyrrolidone as a solvent.

Next, a strip copper foil having a thickness of 10 $\mu$m was prepared as a negative charge collector. The negative electrode mixture slurry was uniformly applied to both surfaces of the negative charge collector and dried, and then, compression molding was performed at constant pressure to fabricate a strip negative electrode.

A strip positive electrode was fabricated as follows.

To prepare a positive electrode mixture slurry, 91 parts by weight of lithium cobaltate, 6 parts by weight of carbon powder, and 3 parts by weight of polyvinylidene fluoride as a binder were mixed and dispersed in N-methyl-2-pyrrolidone as a solvent.

Next, a strip aluminum foil having a thickness of 20 $\mu$m was prepared as a positive charge collector. The positive electrode mixture slurry was uniformly applied to both surfaces of the positive charge collector and dried, and then, compression molding was performed to fabricate a strip positive electrode.

The strip negative electrode and the strip positive electrode fabricated as described above were laminated with separators composed of a microporous polypropylene film, in the order of the negative electrode, the separator, the positive electrode, and the separator, and were wound up many times to form a wound electrode member.

The wound electrode member fabricated as described above was placed in an iron battery can plated with nickel.

The top and bottom of the coiled-type electrode were provided with an insulator, an aluminum positive electrode lead drawn from the positive charge collector was welded to a sheet for breaking a current, and a nickel negative electrode drawn from the negative charge collector was welded to the battery can.

Into a mixed solvent of equi-volume propylene carbonate and dimethyl carbonate, 3% by weight of polyester having k=100, $R^1=CH_2$, and $R^2=CH_2$ and 1 mol/l of $LiPF_6$ were dissolved to prepare a nonaqueous electrolytic solution. The nonaqueous electrolytic solution was poured into the battery can.

Then, a battery cap was fixed on the sheet for breaking a current by caulking joints with an insulated sealing gasket applied with asphalt being interposed, and airtightness within the battery was maintained, and thus a cylindrical nonaqueous electrolytic secondary battery was fabricated.

EXAMPLE 2

A nonaqueous electrolytic secondary battery in this example was similar to that in Example 1 except that a polymer (diester polymer) represented by Chemical formula 8, where m=100, $R^3=CH_2$, $R^4=CH_2$—$CH_2$, and $R^5=CH_2$, instead of polyester was added to a nonaqueous electrolytic solution.

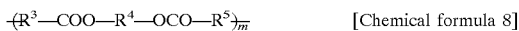  [Chemical formula 8]

EXAMPLE 3

A nonaqueous electrolytic secondary battery in this example was similar to that in Example 1 except that a polymer (a copolymer of ester and ketone) represented by Chemical formula 9, where n=100, $R^6=CH_2$, $R^7=CH_2$—$CH_2$, and $R^8=CH_2$, instead of polyester was added to a nonaqueous electrolytic solution.

  [Chemical formula 9]

EXAMPLE 4

A nonaqueous electrolytic secondary battery in this example was similar to that in Example 1 except that a polymer (a polymer molecule having an ether linkage in the molecule) represented by Chemical formula 10, where g=100, $R^9=CH_2$, $R^{10}=CH_2$—$CH_2$, and $R^{11}=CH_2$, instead of polyester was added to a nonaqueous electrolytic solution.

  [Chemical formula 10]

Comparative Example 1

A nonaqueous electrolytic secondary battery in this comparative example was similar to that in Example 1 except that no polymer was added to a nonaqueous electrolytic solution.

With respect to the nonaqueous electrolyte secondary batteries, 500 cycles of charging and discharging were performed under the conditions described below, and capacity retainability after 500 cycles in relation to the initial cycle was investigated. The results are shown in Table 1.

Charging and discharging conditions: constant-current charging was performed at 0.5 mA, charging was terminated when a closed-circuit voltage reached –20 mV in relation to lithium, and then, discharging was performed until the battery voltage reached 2.5 V.

TABLE 1

|  | Capacity retainability (After 500 cycles) |
| --- | --- |
| Example 1 | 87% |
| Example 2 | 88% |
| Example 3 | 86% |
| Example 4 | 86% |
| Comparative Example 1 | 85% |

Also, with respect to the nonaqueous electrolyte secondary batteries, external short circuits were caused intentionally, and the temperature rise of the batteries was investigated. The highest temperatures reached during the testing are shown in Table 2.

TABLE 2

|  | Highest temperature reached during external short circuit |
| --- | --- |
| Example 1 | 55° C. |
| Example 2 | 52° C. |
| Example 3 | 53° C. |
| Example 4 | 53° C. |
| Comparative Example 1 | 65° C. |

As shown in Table 1, the nonaqueous electrolyte secondary batteries of examples 1 through 4, in which polymers are added to the nonaqueous electrolytic solutions, have larger capacity retainability in comparison with the nonaqueous electrolyte secondary battery of comparative example 1 in which no polymer is added. Also, as shown in Table 2, the nonaqueous electrolyte secondary batteries of examples 1 through 4 have significantly smaller temperature rises in comparison with the nonaqueous electrolytic secondary battery of comparative example 1.

From the results described above, it has been found that the addition of a polymer to the nonaqueous electrolytic solution improves charge and discharge cycling characteristics and relieves the temperature rise during an external short circuit.

EXAMPLE 5

In this example, charging was performed at a charging voltage of 4.3 V after a battery was assembled.

A nonaqueous electrolytic secondary battery was assembled in a manner similar to that in example 1 except that no polyester was added to a nonaqueous electrolytic solution.

Charging was performed at a charging voltage of 4.3 V to the nonaqueous electrolytic secondary battery, and then, 500 cycles of charging and discharging were performed under the conditions described above.

As a result, a capacity retainability after 500 cycles of 87% was obtained, which is higher in comparison with the capacity retainability of 85% obtained when charge and discharge cycling was performed without charging at a charging voltage of 4.3 V (comparative example 1).

From this, it has been found that by charging and discharging under overcharge conditions after the battery is assembled, charge and discharge cycling characteristics are improved.

When the charging voltage was changed from 4.3 V to 4.8 V, the precipitation of lithium in the battery was observed, and the cycling efficiency deteriorated. Accordingly, the charging voltage is preferably set in a range from 4.3 V to less than 4.8 V.

EXAMPLE 6

In this example, a voltage of 4.8 V was applied as a pulse after a battery was assembled.

A nonaqueous electrolytic secondary battery was assembled in a manner similar to that in example 1 except that no polyester was added to a nonaqueous electrolytic solution.

A voltage of 4.8 V was applied as a pulse at 100 kHz to the nonaqueous electrolytic secondary battery, and then, 500 cycles of charging and discharging were performed under the conditions described above.

As a result, a capacity retainability after 500 cycles of 88% was obtained, which shows an improvement in capacity retainability in comparison with the case when charge and discharge cycling was performed without applying a pulse voltage.

From this, it has been found that by applying a pulse voltage to the battery, charge and discharge cycling characteristics are improved.

As described above, in accordance with the nonaqueous electrolytic secondary battery of the present invention, since a polymer is added to a nonaqueous electrolytic solution, charge and discharge cycling characteristics are improved without damaging load characteristics or capacity characteristics, and a temperature rise by an external short circuit can be suppressed.

Also, in accordance with the method of making a nonaqueous electrolytic secondary battery of the present invention, since charging and discharging are performed under overcharge conditions or a pulse voltage is applied to the battery, after the battery is assembled, a nonaqueous electrolytic secondary battery which has excellent charging and discharging characteristics and a small temperature rise by an external short circuit can be manufactured.

What is claimed is:

1. A nonaqueous electrolytic secondary battery comprising:
    a negative electrode comprising a carbonaceous material;
    a positive electrode comprising a lithium-transition metal double oxide;
    a nonaqueous electrolytic solution comprising an electrolytic salt dissolved in a nonaqueous solvent, the nonaqueous solvent comprising a carbonate-based solvent; and
    wherein a hydrocarbon group polymer is dispersed within said nonaqueous electrolytic solution in amount of from 2 to 5% by weight of the nonaqueous electrolytic solution, the hydrocarbon group polymer is represented by any one of the following general formulae:

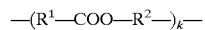

where $R^1$ and $R^2$ are hydrocarbon groups, and wherein k=100;

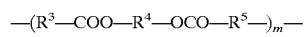

where $R^3$, $R^4$ and $R^5$ are hydrocarbon groups, and wherein m=100;

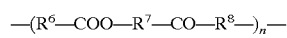

where $R^6$, $R^7$ and $R^8$ are hydrocarbon groups, and wherein n=100; and

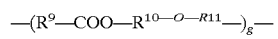

where $R^9$, $R^{10}$ and $R^{11}$ are hydrocarbon groups, and wherein g=100.

2. A nonaqueous electrolytic secondary battery according to claim 1, wherein the electrolytic salt of said nonaqueous solution electrolytic solution is a lithium salt.

3. A nonaqueous electolytic secondary battery according to claim 1, and wherein said hydrocarbon group polymer dispersed within said nonaqueous electrolytic solution is dissolved within said nonaqueous electrolytic solution.

4. A nonaqueous electrolytic secondary battery according to claim 1, wherein said hydrocarbon group polymer has a weight average molecular weight ranging from 500 to 500,000.

5. A nonaqueous electrolytic secondary battery comprising:
    a negative electrode;
    a positive electrode;
    a nonaqueous electrolytic solution comprising an electrolytic salt dissolved in a nonaqueous solvent;
    wherein a polymer is added to said nonaqueous electrolytic solution, and wherein said polymer is represented by any one of the following general formulae:

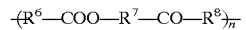

where $R^6$, $R^7$, and $R^8$ are hydrocarbon groups, and wherein n=100: and

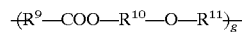

where $R^9$, $R^{10}$, and $R^{11}$ are hydrocarbon groups, and wherein g=100.

* * * * *